US010670755B2

(12) United States Patent
Ray et al.

(10) Patent No.: US 10,670,755 B2
(45) Date of Patent: Jun. 2, 2020

(54) SYSTEMS AND METHODS FOR REFINING ESTIMATED EFFECTS OF PARAMETERS ON AMPLITUDES

(71) Applicant: Chevron U.S.A. Inc., San Ramon, CA (US)

(72) Inventors: Anandaroop Ray, Houston, TX (US); Prasenjit Roy, Houston, TX (US); James Magill, Perth (AU); David Bartel, Houston, TX (US); Reynaldo Cardona, Houston, TX (US); Kabilan Krishnamurthy, Perth (AU)

(73) Assignee: CHEVRON U.S.A. INC., San Ramon, CA (US)

( * ) Notice: Subject to any disclaimer, the term of this patent is extended or adjusted under 35 U.S.C. 154(b) by 311 days.

(21) Appl. No.: 15/943,513

(22) Filed: Apr. 2, 2018

(65) Prior Publication Data
US 2019/0302294 A1 Oct. 3, 2019

(51) Int. Cl.
G01V 1/30 (2006.01)
G01V 1/34 (2006.01)

(52) U.S. Cl.
CPC .............. G01V 1/307 (2013.01); G01V 1/345 (2013.01); G01V 2210/63 (2013.01); G01V 2210/74 (2013.01)

(58) Field of Classification Search
None
See application file for complete search history.

(56) References Cited

U.S. PATENT DOCUMENTS

| 4,982,382 | A | * | 1/1991 | Dablain | G01V 1/282 367/73 |
| 2006/0056272 | A1 | | 3/2006 | Hill | |
| 2007/0036030 | A1 | * | 2/2007 | Baumel | G01V 1/36 367/52 |
| 2010/0027376 | A1 | | 2/2010 | Washbourne | |
| 2011/0046934 | A1 | | 2/2011 | Hatchell | |
| 2013/0223187 | A1 | * | 8/2013 | Thapar | G01V 1/345 367/73 |
| 2017/0074997 | A1 | * | 3/2017 | Pugh | E21B 43/26 |
| 2017/0248719 | A1 | * | 8/2017 | Holman | G01V 1/28 |

(Continued)

OTHER PUBLICATIONS

Zoeppritz, K. (1914). Über Reflexion und Durchgang seismischer Wellen durch Unstetigkeitsflächen; pp. 66-84.

(Continued)

Primary Examiner — Gregory J Toatley, Jr.
Assistant Examiner — Brandon J Becker
(74) Attorney, Agent, or Firm — Esplin & Associates, PC

(57) ABSTRACT

Systems and methods for refining estimated effects of parameters on amplitudes are disclosed. Exemplary implementations may: (a) obtain ranges of parameter values for individual parameters within a subsurface region of interest; (b) generate a first model of the subsurface region of interest; (c) calculate a synthetic seismogram from the first model to determine corresponding amplitudes; (d) store results of applying the synthetic seismogram; (e) repeat steps (b)-(d) for multiple additional models; (f) obtain a subsurface distribution; (g) apply the subsurface distribution to the multiple models and the corresponding amplitudes; (h) generate a representation; and (i) display the representation.

20 Claims, 5 Drawing Sheets

(56) References Cited

U.S. PATENT DOCUMENTS

2018/0275302 A1* 9/2018 Calderon ............... G01V 1/28

OTHER PUBLICATIONS

Eschenbach, T. G. (2006). Technical Note: Constructing Tornado Diagrams with Spreadsheets. The Engineering Economist, 51(2), 195-204.

Braile et a l. "Synthetic Seismogram Calc ulations for Two-Dimensional Velocity Models." In: 1-20 No. TR-1-83-0NR. P UR!)UE Univ Lafayette in Dept of Geosciences. May 20, 1983 (May 20, 1983) Retrieved on May 28, 2019 (May 28, 2019) from <https:/lapps.dtic.mll/dtic/tr/fulltextlu2/a130765.pdf> entire document (81 pages).

Jones. "Estimating subsurface parameter fields for seismic migration: velocity model building." 1-20 In: Encyclopedia of exploration geophys ics. Society of Exploration Geophysicists. Jan. 1, 2014 (Jan. 1, 2014) RetlTe\<ed.on May 28, 2019 (May 28, 2019) from <https:llwww.iongeo,com/conient/documenls/Resource%20Centerrrechnical%20eai:,ers/TP_SEGEncyclopedia_ V-e!ocity_ Model_Building_ 150728.pdf> entire document (21 pages).

PCT International Search Report and Written Opinion, International Application No. PCT/US2019/024269, dated Jun. 18, 2019 (11 pages).

\* cited by examiner

SYSTEMS AND METHODS FOR REFINING ESTIMATED EFFECTS OF PARAMETERS ON AMPLITUDES

FIELD OF THE DISCLOSURE

The present disclosure relates to systems and methods for refining estimated effects of parameters on amplitudes.

BACKGROUND

Current seismic exploration uses seismic reflection amplitudes, in part, to determine geological parameters. The effect the geological parameters have on the seismic reflection amplitudes may be determined through the use of sensitivity analyses. Current sensitivity analyses fix all variables except the variable of interest to determine the fixed variable's effect on seismic amplitudes. Current sensitivity analyses may not account for the interdependency the parameters have on each other, as well as on the seismic amplitude. Current sensitivity analyses provide a partial view of the relevance of a particular parameter and may inappropriately skew the understanding of a subsurface region of interest.

SUMMARY

An aspect of the present disclosure relates to a system configured for refining estimated effects of parameters on amplitudes. The system may include one or more physical computer processors configured by machine-readable instructions. The processor(s) may be configured to (a) obtain ranges of parameter values for individual parameters within a subsurface region of interest. A range of parameter values for a given parameter may constrain parameter values as a function of position on, or around, a given feature of interest within a given subsurface region of interest. The processor(s) may be configured to (b) generate a first model of the subsurface region of interest that defines the parameter values of the parameters as a function of position within the subsurface region of interest. The processor(s) may be configured to (c) calculate a synthetic seismogram from the first model within the subsurface region of interest to determine corresponding amplitudes. The processor(s) may be configured to (d) store results of applying the synthetic seismogram in an electronic storage. The processor(s) may be configured to repeat steps (b)-(d) for multiple additional models. Parameter values for a second model of the subsurface region of interest may have different parameter values for the multiple parameters than the first model. The processor(s) may be configured to (f) obtain, from the electronic storage, a subsurface distribution. The processor(s) may be configured to (g) apply the subsurface distribution to the multiple models and the corresponding amplitudes to refine an estimated effect the parameters have on the corresponding amplitudes. The processor(s) may be configured to (h) generate a representation indicating the refined effect the parameters have on the corresponding amplitudes. The processor(s) may be configured to (i) display, on a graphical user interface, the representation.

An aspect of the present disclosure relates to a method for refining estimated effects of parameters on amplitudes, the method being implemented in a computer system, the computer system including one or more physical computer processors and non-transient electronic storage. The method may include (a) obtaining ranges of parameter values for individual parameters within a subsurface region of interest. A range of parameter values for a given parameter may constrain parameter values as a function of position on, or around, a given feature of interest within a given subsurface region of interest. The method may include (b) generating a first model of the subsurface region of interest that defines the parameter values of the parameters as a function of position within the subsurface region of interest. The method may include (c) calculating a synthetic seismogram from the first model within the subsurface region of interest to determine corresponding amplitudes. The method may include (d) storing results of applying the synthetic seismogram in an electronic storage. The method may include (e) repeating steps (b)-(d) for multiple additional models. Parameter values for a second model of the subsurface region of interest may have different parameter values for the multiple parameters than the first model. The method may include (f) obtaining, from the electronic storage, a subsurface distribution. The method may include (g) applying the subsurface distribution to the multiple models and the corresponding amplitudes to refine an estimated effect the parameters have on the corresponding amplitudes. The method may include (h) generating a representation indicating the refined effect the parameters have on the corresponding amplitudes. The method may include (i) displaying, on a graphical user interface, the representation.

An aspect of the present disclosure relates to a non-transitory computer-readable medium including instructions that, when executed by one or more physical computer processors, cause the one or more physical computer processors to refine estimated effects of one or more parameters on amplitudes by performing steps. A step may include (a) obtaining ranges of parameter values for individual parameters within a subsurface region of interest. A range of parameter values for a given parameter may constrain parameter values as a function of position on, or around, a given feature of interest within a given subsurface region of interest. A step may include (b) generating a first model of the subsurface region of interest that defines the parameter values of the parameters as a function of position within the subsurface region of interest. A step may include (c) calculating a synthetic seismogram from the first model within the subsurface region of interest to determine corresponding amplitudes. A step may include (d) storing results of applying the synthetic seismogram in an electronic storage. A step may include (e) repeating steps (b)-(d) for multiple additional models. Parameter values for a second model of the subsurface region of interest may have different parameter values for the multiple parameters than the first model. A step may include (f) obtaining, from the electronic storage, a subsurface distribution. A step may include (g) applying the subsurface distribution to the multiple models and the corresponding amplitudes to refine an estimated effect the parameters have on the corresponding amplitudes. A step may include (h) generating a representation indicating the refined effect the parameters have on the corresponding amplitudes. One of the steps may include (i) displaying, on a graphical user interface, the representation.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as limiting. As used in the specification and in the claims, the singular form of "a", "an", and "the" include plural referents unless the context clearly dictates otherwise. The use of "angle" or "angles" is to be synonymous with "offset," unless the context clearly dictates otherwise.

The technology disclosed herein, in accordance with one or more various implementations, is described in detail with reference to the following figures. The drawings are provided for purposes of illustration only and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Systems and methods configured to refine estimated effects of parameters on amplitudes may not account for the interdependencies of the parameters. Seismic data and well data from a subsurface region of interest may be used to obtain parameter values and determine relevant ranges of parameter values. The relevant ranges are used in modeling the subsurface region of interest. Models of the subsurface region of interest include parameter values as a function of position with the subsurface region of interest. Using the parameter values to calculate a seismogram, seismic amplitudes may be generated. Distributions of the parameters and the amplitudes may be generated to help account for the interdependencies of the parameters, and the effect the parameters have on the amplitude. A tornado chart may be generated based on the effect these parameters have on the amplitude. The tornado chart may be used to assess the value of seismic data for risking exploration prospects and making asset development decisions.

Figure 1:
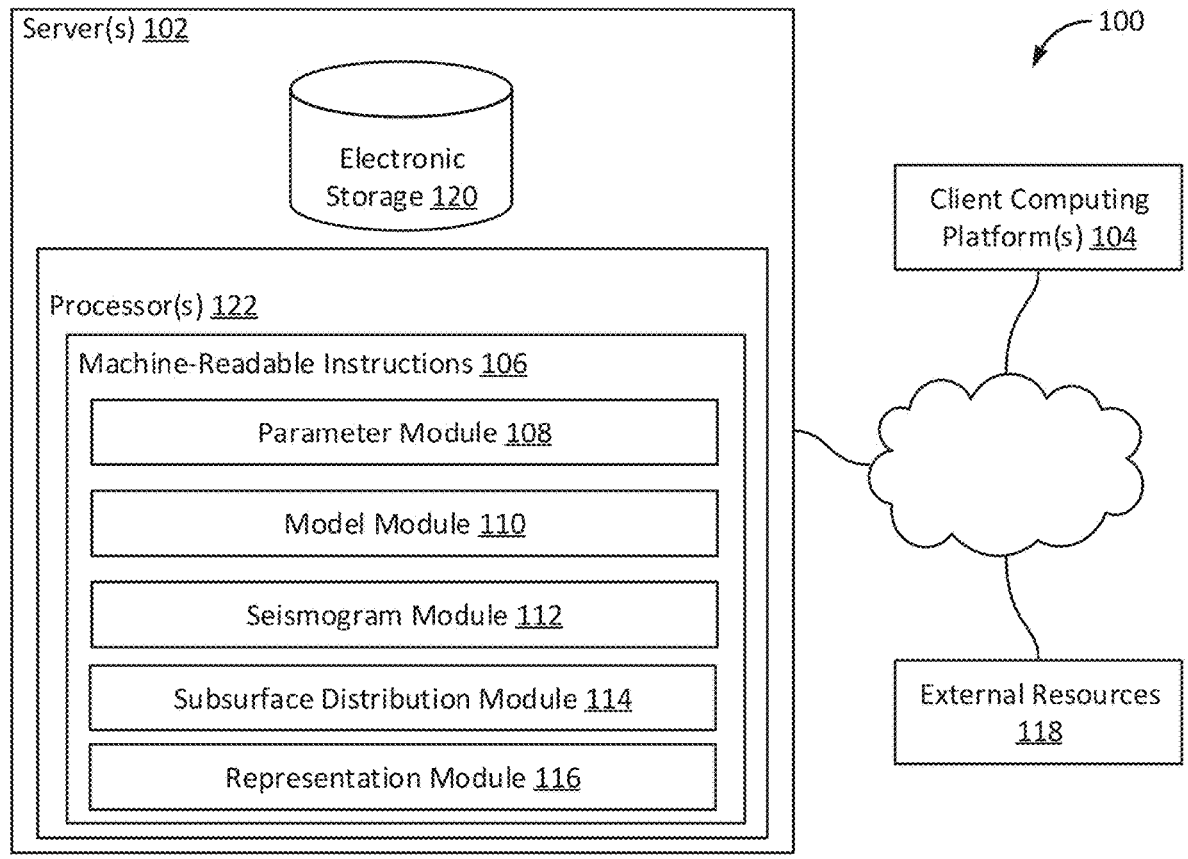
FIG. 1 illustrates a system configured for refining estimated effects of parameters on amplitudes, the method being implemented in a computer system, the computer system including one or more physical computer processors and non-transient electronic storage, in accordance with one or more implementations.

FIG. 1 illustrates a system 100 configured for refining estimated effects of parameters on amplitudes, the method being implemented in a computer system, the computer system including one or more physical computer processors and non-transient electronic storage, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of a parameter module 108, a model module 110, a seismogram module 112, a subsurface distribution module 114, a representation module 116, and/or other instruction modules.

Parameter module 108 may be configured to obtain ranges of parameter values for individual parameters within a subsurface region of interest. Individual parameters may be rock properties, such as lithology type, porosity, volume of shale, water saturation, fluid content, fluid type, and/or other rock properties. Parameter values may be derived from well data and seismic data and be based on a given parameter. For example, porosity may be measured by a ratio comparing the volume of void space in the feature of interest to the total volume of the feature of interest. The subsurface region may include a region that is beneath the surface that may be two-dimensional or three-dimensional. The subsurface region of interest may include a reservoir, such as a conventional or unconventional reservoir.

In some implementations, the obtained ranges of parameter values may be derived from actual data. The actual data may include seismic data obtained using the set-up of FIG. 3 and/or well data. In some implementations, the obtained ranges may be determined stochastically from the actual data.

In some implementations, a range of parameter values for a given parameter may constrain parameter values of the given parameter as a function of position on, or around, a given feature of interest within a given subsurface region of interest. The range of parameter values may be different for different features of interest. For example, a first range of parameter values for porosity of a first feature of interest may be less than 0.2 while a second range of parameter values for porosity of a second feature of interest may be between 0.3 and 0.5. Continuing the example, a first set of parameter values corresponding to the first range of parameter values may not exceed a porosity of 0.2 when sampled. The feature of interest may be a reflecting interface, or a subsurface feature, as shown in FIG. 3.

Figure 3:
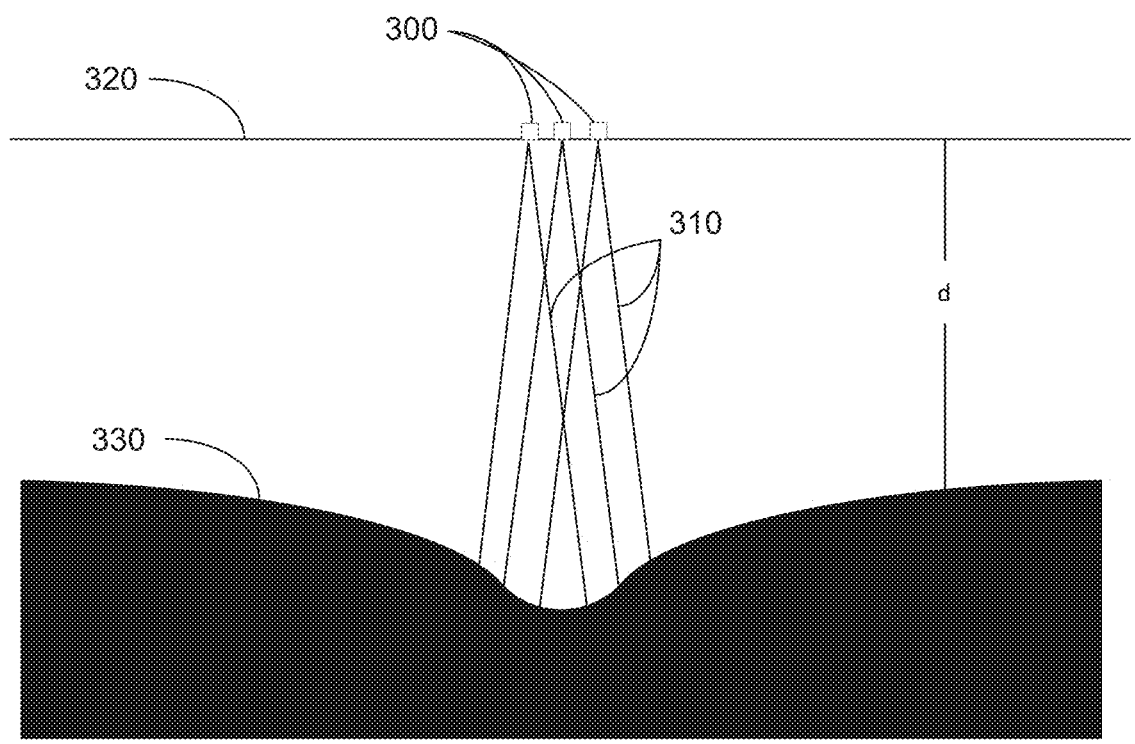
FIG. 3 illustrates a layout to obtain seismic data, in accordance with one or more implementations.

FIG. 3 illustrates a layout to obtain seismic data, in accordance with one or more implementations. Seismic data may be obtained by sending energy 310 into a subsurface region of interest 320 using seismic sources 300 and receiving the signal reflected off of a subsurface feature 330 at seismic receivers 300. Zero-offset source-receiver pairs 300 may send energy waves 310 into subsurface region 320. Energy waves 310 may reflect or refract off subsurface feature 330. Source-receiver pairs 300 may receive the reflected and refracted energy waves 310 which may be converted into seismic amplitudes.

In some implementations, a seismic source may send seismic energy into the subsurface, which may then be reflected and/or refracted by subsurface features and may be recorded at seismic receivers at various distances away from a seismic source. Seismic energy may include acoustic compression waves. For example, the seismic source may generate acoustic compression waves and direct them towards a subsurface region that includes various lithologies (e.g., underground rock structures) for the purpose of identifying hydrocarbon deposits contained within the various lithologies (e.g., crude oil, natural gas, etc.). Seismic data may be generated from seismic signals (e.g., the reflections of the seismic energy off of the various subsurface lithologies) received by seismic sensors, such as geophones or other acoustic detectors.

Referring back to FIG. 1, model module 110 may be configured to generate a first model of the subsurface region of interest that defines the parameter values of the parameters as a function of position within the subsurface region of interest. The first model may include sets of parameter values. A given set of parameter values may correspond to a given parameter. The first model may include a set of parameter values for every parameter.

Model module 110 may be configured to repeat generating a model of the subsurface region of interest that defines the parameter values of the parameters as a function of position within the subsurface region of interest for multiple additional models. In some implementations, sets of parameter values for a second model of the subsurface region of interest may have different parameter values for the multiple parameters than the sets of parameter values for the first model. In some implementations, sets of parameter values for a second model of the subsurface region of interest may be constrained by the obtained ranges of parameter values used in constraining the sets of parameter values for the first model.

In some implementations, generating the multiple models may include sampling individual parameter values within the obtained ranges of parameter values for individual parameters. Sampling individual parameter values may include generating parameter values constrained by the obtained ranges of parameter values.

Seismogram module 112 may be configured to calculate a synthetic seismogram from the first model within the subsurface region of interest to determine corresponding amplitudes. The synthetic seismogram may use well data, seismic data taken from within, and near, the well at one or more angles of interest, density logs, velocity models, reflection coefficient series, wavelets, and/or other information. The well data may be sampled to generate seismic impedance models. Seismic impedance models are the product of density and seismic velocity and vary among reflecting interfaces and affect the reflection coefficient. The reflection coefficient may be a ratio of amplitude of the reflected wave to the incident wave and describe how much energy is reflected. The wavelet may be determined based on a frequency response and band width similar to nearby seismic data. The well data and the seismic data may be forward modeled at pre-stack angles of interest using a Zoeppritz equation and the wavelet to generate a seismogram. In some implementations, the amplitudes may be a function of the parameters, such that the parameters may be used to determine the amplitudes. The seismogram may model the acoustic energy traveling through the layers of the subsurface region of interest, which may be illustrated as seismic amplitudes. In some implementations, seismic data may be obtained using a reflection angle or a range of reflection angles. In some implementations, the synthetic seismogram represents a full range of reflection angles.

Seismogram module 112 may be configured to store results of applying the synthetic seismogram in an electronic storage.

Seismogram module 112 may be configured to repeat calculating a synthetic seismogram and storing the results for multiple additional models.

Subsurface distribution module 114 may be configured to obtain, from the electronic storage, a subsurface distribution. The distribution may be a joint marginal distribution, a frequency distribution, a conditional distribution, and/or other distributions. The marginal distribution may separate out a subset of variables and determine the probability distribution of the variable contained within the subset. The joint marginal distribution may be similar but determine the probability distribution of the two variables contained within the subset. $\int_y p(x, y)dy = p(x)$ may be used to solve for the probability of x, whereas $\int_x p(x, y)dx = p(y)$ may be used to solve for the probability of y. In some implementations, the joint distribution of seismic amplitude at angles of interest and individual parameters may be marginalized at individual pre-stack angles of interest. For example, rock properties, such as porosity, may be compared against amplitudes at multiple angles of interest in a marginal distribution.

Figure 4:
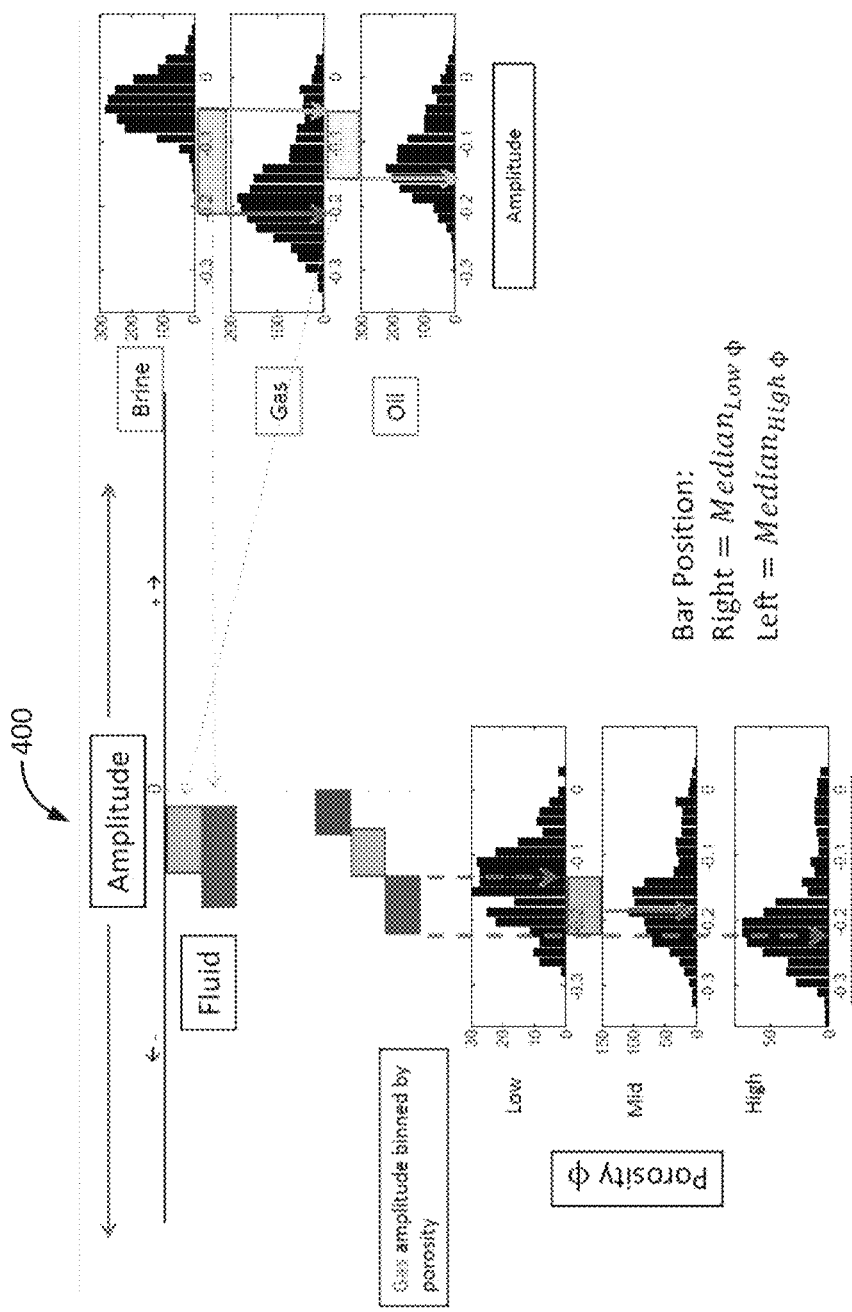
FIG. 4 illustrates distributions of parameters against seismic amplitude, in accordance with one or more implementations.

Subsurface distribution module 114 may be configured to apply the subsurface distribution to the multiple models and the corresponding amplitudes to refine an estimated effect the parameters may have on the corresponding amplitudes. In some implementations, applying the subsurface distribution may be used to see how the parameters not of interest affect a parameter of interest. In some implementations, applying the subsurface distribution to the multiple models and the corresponding amplitudes includes determining changes to the amplitudes in response to changes to individual parameter values of the multiple models. The resulting distribution, which may be a marginalized distribution, may be used to group and sort the parameter values. In some implementations, the resulting distribution may be used to focus on how a given parameter affects amplitude as other parameters vary. For example, the seismic amplitudes may be apportioned by ranges for individual parameters to generate a two-dimensional probability, as shown in FIG. 4.

The amplitudes may change as a result of different parameter values for a given parameter. This change may be used to refine the estimated effect the parameters may have on the corresponding amplitudes, while maintaining the interdependency of the parameters. For example, large changes of parameter values for a given parameter may result in little to no change in amplitude indicating the given parameter has little effect on the amplitude. In one example, small changes of parameter values for a given parameter may result in large changes in amplitude indicating the given parameter has a large effect on the amplitude.

Representation module 116 may be configured to generate a representation indicating the refined effect the parameters have on the corresponding amplitudes. The refined effect may be an improved understanding of the interdependence between individual parameters and the effect individual parameters may have on the amplitude.

In some implementations, the representation may depict an order to the individual parameters by a magnitude of the refined effect the individual parameters have on the corresponding amplitudes. The magnitude may be a quantitative impact of an individual parameter. For example, a first parameter that greatly affects the amplitude may be at a top of the representation, a second parameter that affects the amplitude less than the first parameter may be below the first parameter in the representation, a third parameter that affects the amplitude less than the second parameter may be below the second parameter in the representation, and so on with a parameter that least affects the amplitude at the bottom of the representation.

In some implementations, the representation may be a tornado chart, as shown in FIG. 4. FIG. 4 illustrates distributions of parameters against seismic amplitude, in accordance with one or more implementations. Bar chart 400 is a type of bar chart where certain variables are listed vertically instead of horizontally. A range of amplitudes for a given parameter may be plotted. The range of amplitudes may be determined based on a median amplitude. For example, a range of amplitudes may be determined based on the median amplitude of brine and the median amplitude of gas. This range of amplitudes may represent the top bar on bar chart 400. In one example, a range of amplitudes may be determined based on the median amplitude of brine and the median amplitude of oil. This range of amplitudes may represent the second from the top bar on bar chart 400. Another range of amplitudes may be determined based on the median amplitude of gas and the median amplitude of oil. The range for oil at the top of bar chart 400 may be smaller than the range for gas.

FIG. 4 illustrates example values obtained for various fluid types and example values obtained for different ranges of porosity. A difference in median amplitude at the extreme values of a parameter may indicate the variability of seismic amplitude associated with a parameter. For example, porosity may be used to bin a range of gas amplitudes. Gas may be binned between the median amplitude for low porosity values and the median amplitude for high porosity values.

Figure 5:
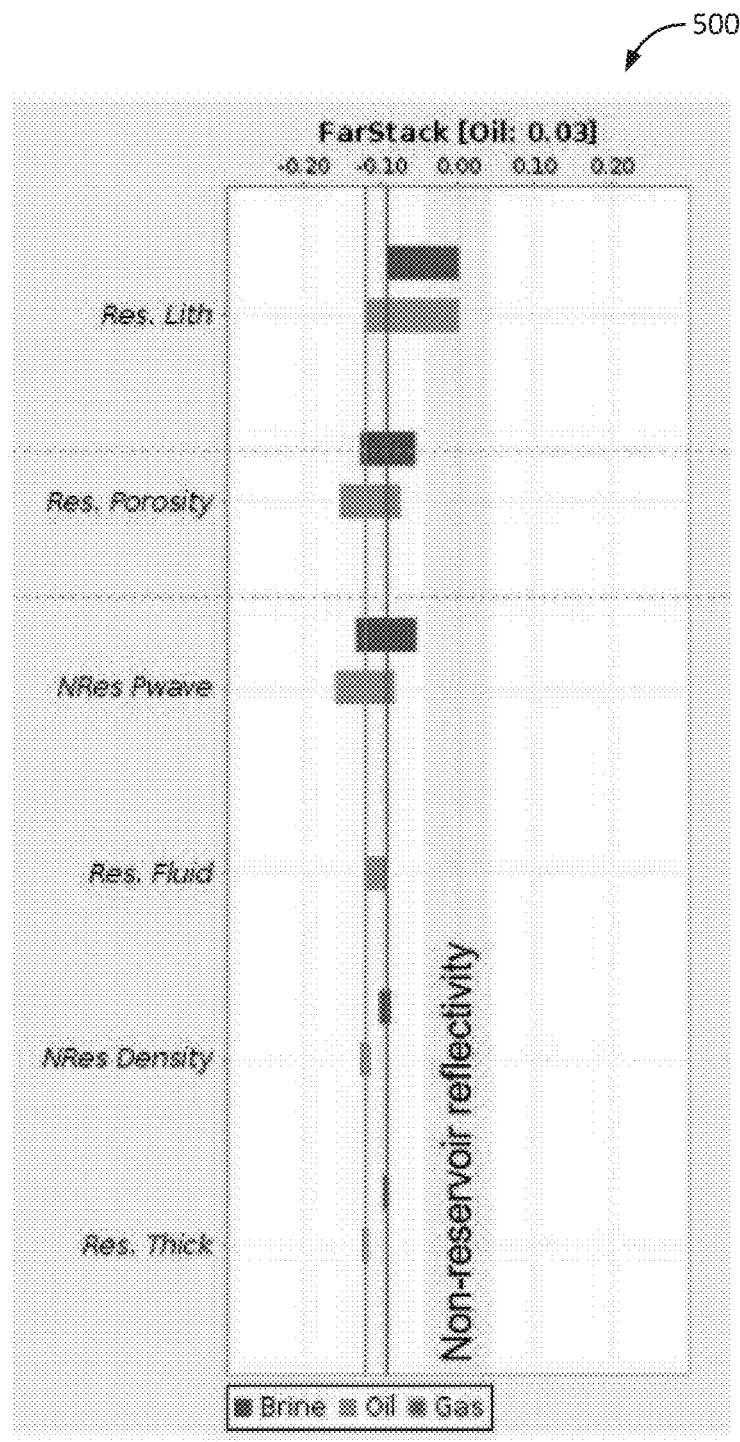
FIG. 5 illustrates a tornado chart indicating the impact of parameters on the amplitude, in accordance with one or more implementations.

FIG. 5 illustrates a tornado chart indicating the impact of parameters on the amplitude, in accordance with one or more implementations. Tornado chart 500 may graphically display the effect the parameters have on the amplitudes. For example, binning amplitude by fluid type for a given parameter, FIG. 5 illustrates reservoir lithology has a greater impact on amplitude than reservoir porosity. Reservoir porosity has a greater impact on amplitude than non-reservoir P wave velocity, reservoir fluid type, non-reservoir density, or reservoir thickness, and so on. In some implementations, the parameters may be ordered by the magnitude of their effect between the pre-stack amplitude and the background to understand which parameters potentially have the greatest effect based on the representation.

Referring back to FIG. 1, representation module 116 may be configured to display, on a graphical user interface, the representation. The graphical user interface may include a user interface based on graphics instead of text; uses a mouse as well as a keyboard as an input device, according to some implementations.

In some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may include non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute modules 108, 110, 112, 114, 116, and/or other modules. Processor(s) 122 may be configured to execute modules 108, 110, 112, 114, 116, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and 116 are illustrated in FIG. 1 as being implemented within a single processing unit, in implementations in which processor(s) 122 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As an example, processor(s) 122 may be configured to execute one or more additional modules that may perform some or all of the functionality attributed below to one of modules 108, 110, 112, 114, and/or 116.

Figure 2:
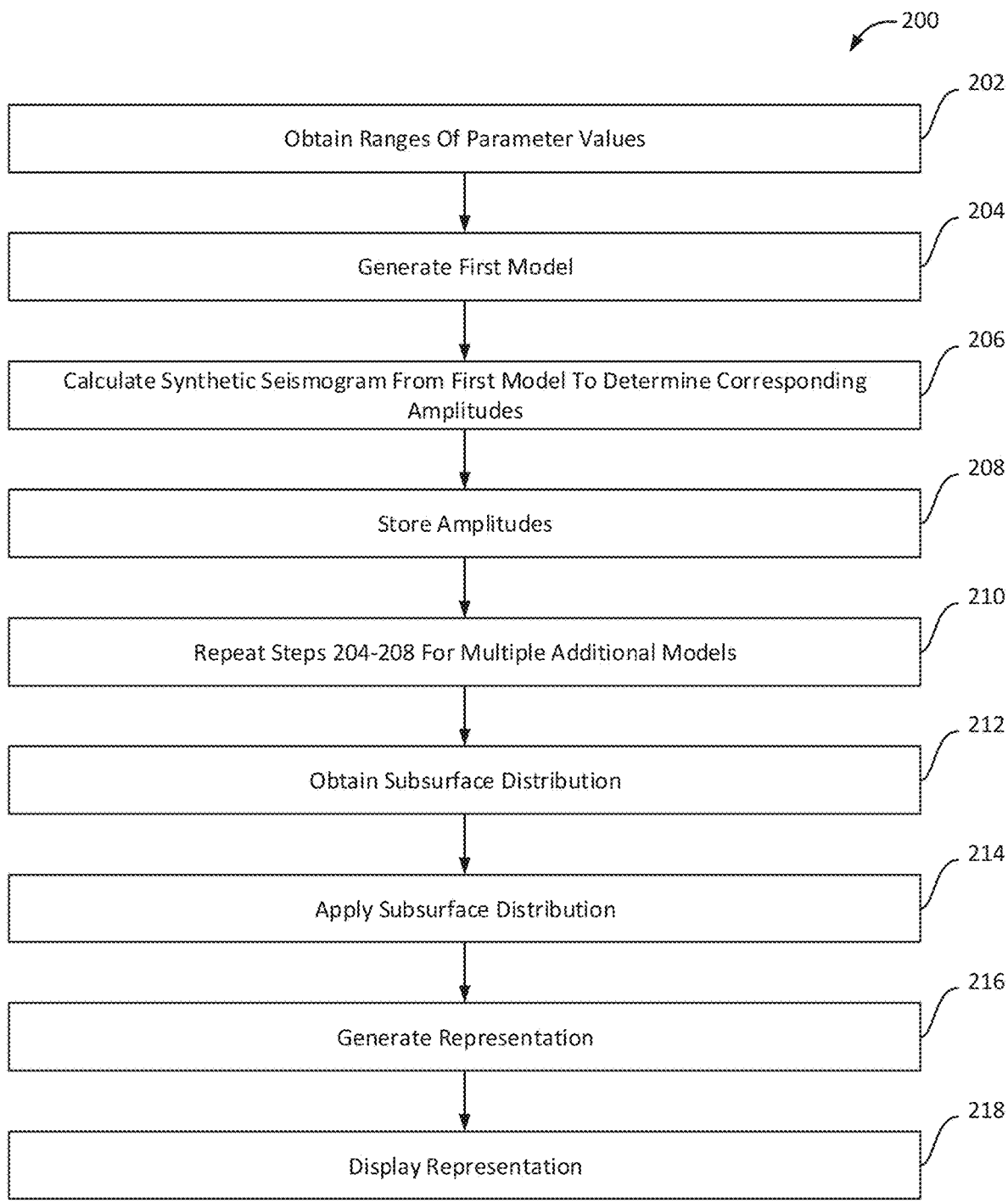
FIG. 2 illustrates a method for refining estimated effects of parameters on amplitudes, the method being implemented in a computer system, the computer system including one or more physical computer processors and non-transient electronic storage, in accordance with one or more implementations.

FIG. 2 illustrates a method 200 for refining estimated effects of parameters on amplitudes, the method being implemented in a computer system, the computer system including one or more physical computer processors and non-transient electronic storage, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining ranges of parameter values for individual parameters within a subsurface region of interest. A range of parameter values for a given parameter may constrain parameter values as a function of position on, or around, a given feature of interest within a given subsurface region of interest. In some implementations, the range of parameter values may be derived from actual data, such as seismic data and/or well data. In some implementations, the obtained ranges may be determined stochastically from the actual data. Operation 202 may be performed by one or more physical computer processors configured by machine-readable instructions including a module that is the same as or similar to parameter module 108, in accordance with one or more implementations.

An operation 204 may include generating a first model of the subsurface region of interest that defines the parameter values of the parameters as a function of position within the subsurface region of interest. In some implementations, a first model may include sets of parameter values. A given set of parameter values may correspond to a given parameter. The first model may include a set of parameter values for every parameter. Operation 204 may be performed by one or more physical computer processors configured by machine-readable instructions including a module that is the same as or similar to model module 110, in accordance with one or more implementations.

An operation 206 may include calculating a synthetic seismogram from the first model within the subsurface region of interest to determine corresponding amplitudes. In some implementations, amplitudes may be a function of the parameters, such that the parameters may be used to determine the amplitudes. In some implementations, seismic data may be obtained using a reflection angle or a range of reflection angles. Operation 206 may be performed by one or more physical computer processors configured by machine-readable instructions including a module that is the same as or similar to seismogram module 112, in accordance with one or more implementations.

An operation 208 may include storing results of applying the synthetic seismogram in an electronic storage. Operation 208 may be performed by one or more physical computer processors configured by machine-readable instructions including a module that is the same as or similar to seismogram module 112, in accordance with one or more implementations.

An operation 210 may include repeating operation 204-208 for multiple additional models. In some implementations, parameter values for a second model of the subsurface region of interest may have different parameter values for the multiple parameters than the first model. In some implementations, sets of parameter values for a second model of the subsurface region of interest may be constrained by the obtained ranges of parameter values used in constraining the sets of parameter values for the first model. Operation 210 may be performed by one or more physical computer processors configured by machine-readable instructions including a module that is the same as or similar to model module 110 and seismogram module 112, in accordance with one or more implementations.

An operation 212 may include obtaining, from the electronic storage, a subsurface distribution. In some implementations, the subsurface distribution may be a joint marginal distribution and/or other distributions. Operation 212 may be performed by one or more physical computer processors configured by machine-readable instructions including a module that is the same as or similar to subsurface distribution module 114, in accordance with one or more implementations.

An operation 214 may include applying the subsurface distribution to the multiple models and the corresponding amplitudes to refine an estimated effect the parameters have on the corresponding amplitudes. In some implementations, applying the subsurface distribution to the multiple models and the corresponding amplitudes includes determining changes to the amplitudes in response to changes to individual parameter values of the multiple models. In some implementations, the seismic amplitudes may be apportioned by ranges for individual parameters to generate a two-dimensional probability. Operation 214 may be performed by one or more physical computer processors configured by machine-readable instructions including a module that is the same as or similar to subsurface distribution module 114, in accordance with one or more implementations.

An operation 216 may include generating a representation indicating the refined effect the parameters have on the corresponding amplitudes In some implementations, the refined effect may be an improved understanding of the interdependence between individual parameters and the effect individual parameters may have on the amplitude In some implementations, the representation may depict an order to the individual parameters by a magnitude of the refined effect the individual parameters have on the corresponding amplitudes. In some implementations, the representation may be a tornado chart. Operation 216 may be performed by one or more physical computer processors configured by machine-readable instructions including a module that is the same as or similar to representation module 116, in accordance with one or more implementations.

An operation 218 may include displaying, on a graphical user interface, the representation. Operation 218 may be performed by one or more physical computer processors configured by machine-readable instructions including a module that is the same as or similar to representation module 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method for refining estimated effects of parameters on amplitudes, the method being implemented in a computer system, the computer system including one or more physical computer processors and non-transient electronic storage, the method comprising:
    (a) obtaining ranges of parameter values for individual parameters within a subsurface region of interest, wherein a range of parameter values for a given parameter constrains parameter values as a function of position on, or around, a given feature of interest within a given subsurface region of interest;
    (b) generating a first model of the subsurface region of interest that defines the parameter values of the parameters as a function of position within the subsurface region of interest;
    (c) calculating a synthetic seismogram at angles of interest from the first model corresponding to a feature of interest within the subsurface region of interest to determine corresponding amplitudes;
    (d) storing results of calculating the synthetic seismogram in an electronic storage;
    (e) repeating steps (b)-(d) for multiple additional models, wherein parameter values for a second model of the subsurface region of interest have different parameter values for the multiple parameters than the first model;
    (f) obtaining, from the electronic storage, a subsurface distribution;
    (g) applying the subsurface distribution to the multiple models and the corresponding amplitudes to refine an estimated effect the parameters have on the corresponding amplitudes;
    (h) generating a representation indicating the refined effect the parameters have on the corresponding amplitudes; and
    (i) displaying, on a graphical user interface, the representation.

2. The computer-implemented method of claim 1, wherein generating the multiple models comprises sampling individual parameter values within the obtained ranges of parameter values for individual parameters.

3. The computer-implemented method of claim 1, wherein applying the subsurface distribution to the multiple models and the corresponding amplitudes to refine an estimated effect the parameters have on the corresponding amplitudes comprises determining changes to the amplitudes in response to changes to individual parameter values of the multiple models.

4. The computer-implemented method of claim 1, wherein the obtained ranges of parameter values are derived from actual data.

5. The computer-implemented method of claim 1, wherein the amplitudes are a function of the parameters.

6. The computer-implemented method of claim 1, wherein the subsurface distribution comprises a marginal distribution.

7. The computer-implemented method of claim 1, wherein the representation depicts an order to the individual parameters by a magnitude of the refined effect the individual parameters have on the corresponding amplitudes.

8. A system configured to refine estimated effects of parameters on amplitudes, the system comprising:
    electronic storage;
    a graphical user interface; and
    one or more physical computer processors configured by machine-readable instructions to:
        (a) obtain ranges of parameter values for individual parameters of a subsurface region of interest, wherein a range of parameter values for a given parameter constrains parameter values as a function of position on, or around, a given feature of interest within a given subsurface region of interest;
        (b) generate a first model of the subsurface region of interest that defines the parameter values of the parameters as a function of position within the subsurface region of interest;
        (c) calculate a synthetic seismogram at angles of interest from the first model corresponding to a feature of interest within the subsurface region of interest to determine corresponding amplitudes;
        (d) store results of calculating the synthetic seismogram in the electronic storage;
        (e) repeat steps (b)-(d) for multiple additional models, wherein the parameter values for a second model of the subsurface region of interest have different parameter values for the multiple parameters than the first model;
        (f) obtain, from the electronic storage, a subsurface distribution;
        (g) apply the subsurface distribution to the multiple models and the corresponding amplitudes to refine an estimated effect the parameters have on the corresponding amplitudes;
        (h) generate, on the one or more physical computer processors, a representation indicating the refined effect the parameters have on the corresponding amplitudes; and
        (i) display, on a graphical user interface, the representation.

9. The system of claim 8, wherein generating the multiple models causes the one or more physical computer processors configured by machine-readable instructions to sample individual parameter values within the obtained ranges of parameter values for individual parameters.

10. The system of claim 8, wherein applying the subsurface distribution to the multiple models and the corresponding amplitudes to refine an estimated effect the parameters have on the corresponding amplitudes causes the one or more physical computer processors configured by machine-readable instructions to determine changes to the amplitudes in response to changes to individual parameter values of the multiple models.

11. The system of claim 8, wherein the obtained ranges of parameter values are derived from actual data.

12. The system of claim 8, wherein the amplitudes are a function of the parameters.

13. The system of claim 8, wherein the subsurface distribution comprises a marginal distribution.

14. The system of claim 8, wherein the representation depicts an order to the individual parameters by a magnitude of the refined effect the individual parameters have on the corresponding amplitudes.

15. A non-transitory computer-readable medium including instructions that, when executed by one or more physical computer processors, cause the one or more physical computer processors to refine estimated effects of parameters on amplitudes by performing the steps of:
  (a) obtaining ranges of parameter values for individual parameters of a subsurface region of interest, wherein a range of parameter values for a given parameter constrains parameter values as a function of position on, or around, a given feature of interest within a given subsurface region of interest;
  (b) generating a first model of the subsurface region of interest that defines the parameter values of the parameters as a function of position within the subsurface region of interest;
  (c) calculating a synthetic seismogram at angles of interest from the first model corresponding to a feature of interest within the subsurface region of interest to determine corresponding amplitudes;
  (d) storing results of calculating the synthetic seismogram in the electronic storage;
  (e) repeating steps (b)-(d) for multiple additional models, wherein the parameter values for a second model of the subsurface region of interest have different parameter values for the multiple parameters than the first model;
  (f) obtaining, from the electronic storage, a subsurface distribution;
  (g) applying the subsurface distribution to the multiple models and the corresponding amplitudes to refine an estimated effect the parameters have on the corresponding amplitudes;
  (h) generating a representation indicating the refined effect the parameters have on the corresponding amplitudes; and
  (i) displaying, on a graphical user interface, the representation.

16. The non-transitory computer-readable medium of claim 15, wherein generating the multiple models comprises sampling individual parameter values within the obtained ranges of parameter values for individual parameters.

17. The non-transitory computer-readable medium of claim 15, wherein applying the subsurface distribution to the multiple models and the corresponding amplitudes to refine an estimated effect the parameters have on the corresponding amplitudes comprises determining changes to the amplitudes in response to changes to individual parameter values of the multiple models.

18. The non-transitory computer-readable medium of claim 15, wherein the obtained ranges of parameter values are derived from actual data.

19. The non-transitory computer-readable medium of claim 15, wherein the amplitudes are a function of the parameters.

20. The non-transitory computer-readable medium of claim 15, wherein the representation depicts an order to the individual parameters by a magnitude of the refined effect the individual parameters have on the corresponding amplitudes.

* * * * *